United States Patent [19]

Posh

[11] Patent Number: 4,658,366
[45] Date of Patent: Apr. 14, 1987

[54] METHODS AND APPARATUS FOR ACCURATELY COMPLETING PRE-PRINTED FORMS

[76] Inventor: David R. Posh, 630 Littlefield Bldg., Austin, Tex. 78701

[21] Appl. No.: 639,077

[22] Filed: Aug. 9, 1984

[51] Int. Cl.$^4$ ............................................. G06F 15/20
[52] U.S. Cl. .................................. 364/523; 364/200; 400/279
[58] Field of Search ... 364/523, 518, 521, 200 MS File, 364/900 MS File; 400/61-64

[56] References Cited

U.S. PATENT DOCUMENTS

| | | | |
|---|---|---|---|
| 3,403,386 | 9/1968 | Perkins et al. | 364/200 X |
| 3,512,138 | 5/1970 | May et al. | 364/900 |
| 3,829,855 | 8/1974 | Kolpek et al. | 364/900 |
| 3,968,868 | 7/1976 | Greek, Jr. et al. | 197/19 |
| 4,000,486 | 12/1976 | Schomburg | 364/200 |
| 4,066,015 | 1/1978 | Polko | 101/228 |
| 4,264,226 | 4/1981 | Bowles et al. | 400/709 |
| 4,311,399 | 1/1982 | Wegryn et al. | 400/76 |
| 4,403,301 | 9/1983 | Fessel | 364/900 |
| 4,416,558 | 11/1983 | McInroy et al. | 364/900 |

OTHER PUBLICATIONS

IBM Technical Disclosure Bulletin, "Carrier Positioning", E. S. Petterson, vol. 17, No. 4, Sep. 1974.

*Primary Examiner*—Errol A. Krass
*Assistant Examiner*—H. R. Herndon
*Attorney, Agent, or Firm*—Shapiro and Shapiro

[57] ABSTRACT

For accurate completion of pre-printed forms on computer systems having printers with different characters-per-inch (CPI) printing capabilities, the desired data print locations of blank fields along respective print lines of a form are defined independently of CPI density, as distances from a reference location on the form. The distances are determined by positioning a user-selected reference mark on a print carrier (of a printer) at the beginning of each field. Data is then accurately printed in each field at a selected CPI density by converting the distances to printable character locations at the selected density and printing corresponding data at each of the determined locations.

33 Claims, 3 Drawing Figures

METHODS AND APPARATUS FOR ACCURATELY COMPLETING PRE-PRINTED FORMS

BACKGROUND OF THE INVENTION

The present invention relates generally to pre-printed forms and more particularly to improved methods and apparatus for accurately completing such forms.

Pre-printed forms are finding use in an ever increasing variety of government and business-related applications to simplify and standardize record keeping procedures. Numerous forms of this type are currently in use, ranging from simple forms which may be completed with just several data entries to complex forms requiring extensive data entries and associated mathematical calculations. Frequently, office personnel must complete these forms manually, either by hand or using a typewriter. Such manual procedures are, at minimum, quite tedious and highly inefficient but are particularly burdensome in the case of complex forms involving mathematical calculations. For example, it is not unusual that after a complex form has been completed, corrections or revisions must be made. Even where only one correction is made, if a calculation is affected, numerous changes may be required on the form.

In an effort to solve the problems associated with manual completion of pre-printed forms, various computerized systems have been developed which substantially automate the form completion process. Broadly speaking, these systems involve the use of a computerized representation of the areas (or fields) on the form wherein data is to be inserted, with the corresponding data being entered into the system by an operator at a computer terminal. The representation of the fields is generally defined to permit completion of the form at a specific character per inch (CPI) density, and usually includes the length of each field as a number of characters at that density, and the print location of the beginning of each field as a character column number at that density and corresponding line number. Thus, with a compatible CPI printer, the operator-entered data may be put in hard copy by loading the printer with a blank form and instructing the computer to print the data. Naturally, the computer may be programmed to perform any necessary mathematical calculations and to update all previous data entries in response to a correction or revision affecting any given calculation.

While systems of the foregoing type have indeed enhanced personnel efficiency in some instances, they suffer from a lack of flexibility which has prevented their widespread application. Perhaps the most restrictive aspect of these systems is their limitation to operation with specific types of printers, usually 80 character columns at 10 CPI (which matches the width and density of a typical computer display screen). So limited, these systems cannot accommodate many standard pre-printed forms set up for completion at different CPI densities. Moreover, the user of such a system is not entirely free to change equipment if continued use of a particular system is contemplated. Rather, the user is constrained to select equipment compatible with the limitations of that system and is thus precluded from selecting other, perhaps more generally desirable equipment.

The present invention overcomes these and other deficiencies of present computerized form completion systems.

SUMMARY OF THE INVENTION

Briefly stated, the present invention provides methods and apparatus for completing a pre-printed form defined at a particular CPI density, whereby the print location of each field to be completed is defined independently of a CPI density and whereby data corresponding to each field is accurately printed on the form at a selected CPI density greater than or equal to the particular density at which the form is defined.

More particularly, according to one of its broad aspects, the invention provides a method applicable in a computerized system for formatting the print-out of stored character data on a pre-printed form containing a plurality of parallel print lines having blank fields to be completed by the printing of corresponding character data therein, the respective lengths of the blank fields being defined by corresponding numbers of characters at a particular CPI density. The system includes a printer having a print carrier with a print head, means for holding a pre-printed form for the printing of lines of characters thereon by the print head and means for causing relative movement of the print head and the form along the print lines in distance increments substantially smaller than the average character width at the particular CPI density. The method of the invention achieves definition of the locations of the blank fields independently of CPI density so as to permit completion of the fields at a selected CPI density greater than or equal to the particular density at which the form is defined, and comprises placing a pre-printed form in the form holding means, selecting a visible reference mark on the print carrier which is positioned in fixed relation to the print head, selecting a reference location on the pre-printed form, causing relative movement of the print carrier and the form to position the reference mark successively at the desired print location on the form for a selected character position within each blank field to be completed, determining from that movement the number of distance increments, in the direction of the print lines, between each of the print locations and the reference location, and storing the resulting numbers of distance increments.

In accordance with another of its broad aspects, the invention provides a method applicable in a computerized system for printing stored character data on a pre-printed form of the aforementioned type, the system being characterized in that the lengths of the blank fields are defined by corresponding numbers of characters at a particular CPI density, in that the location of each blank field along its respective print line is defined by a number of small distance increments, in the direction of that print line, between the desired print location for a selected character position in that field and a reference location on the form, and further in that the system includes a printer having a print head for printing lines of characters at a selected CPI density greater than or equal to the aforesaid particular density and means for holding a pre-printed form for the printing of lines of characters thereon by the print head. This method accomplishes accurate printing of corresponding character data in the blank fields at the selected CPI density and comprises, for each blank field to be completed, determining from the number of distance increments defining the field location and from the selected CPI density a printable character location nearest the desired print location for the selected character position in that field and printing the corresponding character data at the selected density with the selected character position at the determined printable location.

In accordance with still another broad aspect of the invention, the foregoing methods may be combined for application in a single system.

Other broad aspects of the invention relate to apparatus for carrying out the foregoing methods; and these as well as more detailed aspects of the invention, along with its various features and advantages, will be understood from the ensuing description of the preferred embodiments taken in conjunction with the accompanying drawings.

BRIEF DESCRIPTION OF THE DRAWINGS

FIG. 3 is a fragmentary detail view of the pre-printed form in FIG. 2.

DETAILED DESCRIPTION OF THE PREFERRED EMBODIMENTS

Generally speaking, computerized completion of a pre-printed form involves a two-phase process: form generation and data entry/print-out. During the form generation phase, a computerized representation of the blank fields is created to format the subsequent data print-out. In particular, the parameters necessary to define the fields are entered and stored, including the length of each field as a number of characters at a particular CPI density, and the print location of each field. The print location of each blank field is ordinarily defined by a print line number and a character column position based on the CPI density used for defining the field lengths. During the data entry/print-out phase, data is entered by a user, correlated with the stored representation of the blank fields and then printed on a blank form.

Due to the manner in which the print locations of the fields are specified in the foregoing process, an accurate print-out of the data entered can be obtained only when using a printer having the same CPI density as that which was used to define the fields. With any other printer, the printed data will be misaligned with the desired print locations. For example, a print location defined at 60 character positions from a left margin at 10 CPI is equivalent to a print location defined at 72 character positions from the margin at 12 CPI. Thus, it is evident that a 12 CPI printer cannot be used in a system of the foregoing type to print forms defined at 10 CPI.

As will be apparent hereinafter, the present invention avoids such limitations in computerized form completion systems. Basically, this result is achieved by defining the print locations of the blank fields independently of a CPI density and then converting the locations to match the CPI capability of a particular printer at the time of print-out in the manner presently to be described in detail.

Figure 1:
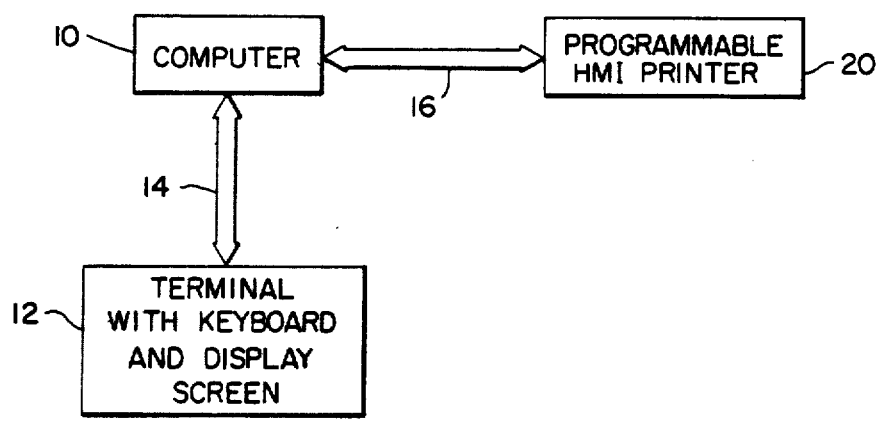
FIG. 1 is a diagrammatic representation of a system for completing pre-printed forms in accordance with the invention.

Referring now to the drawings, FIG. 1 illustrates diagrammatically a system for completing pre-printed forms in accordance with the present invention. As shown therein, the system comprises a computer 10, a terminal with keyboard and display screen 12 and a programmable horizontal motion index (HMI) printer 20, all interconnected via links 14 and 16 in a conventional manner. While it will be apparent from the discussion hereinafter that any number of computer systems may be used to implement the invention, it is assumed for the purposes of example that the system of FIG. 1 comprises an International Business Machines Corporation (IBM) personal computer (with BASIC compiler), including both the computer 10 and terminal 12, and a Qume Corporation Sprint Micro 3 printer. Naturally, the personal computer is equipped with the usual memory and storage for data and program instructions as well as an operating system which permits programmed control of the printer 20.

Figure 2:
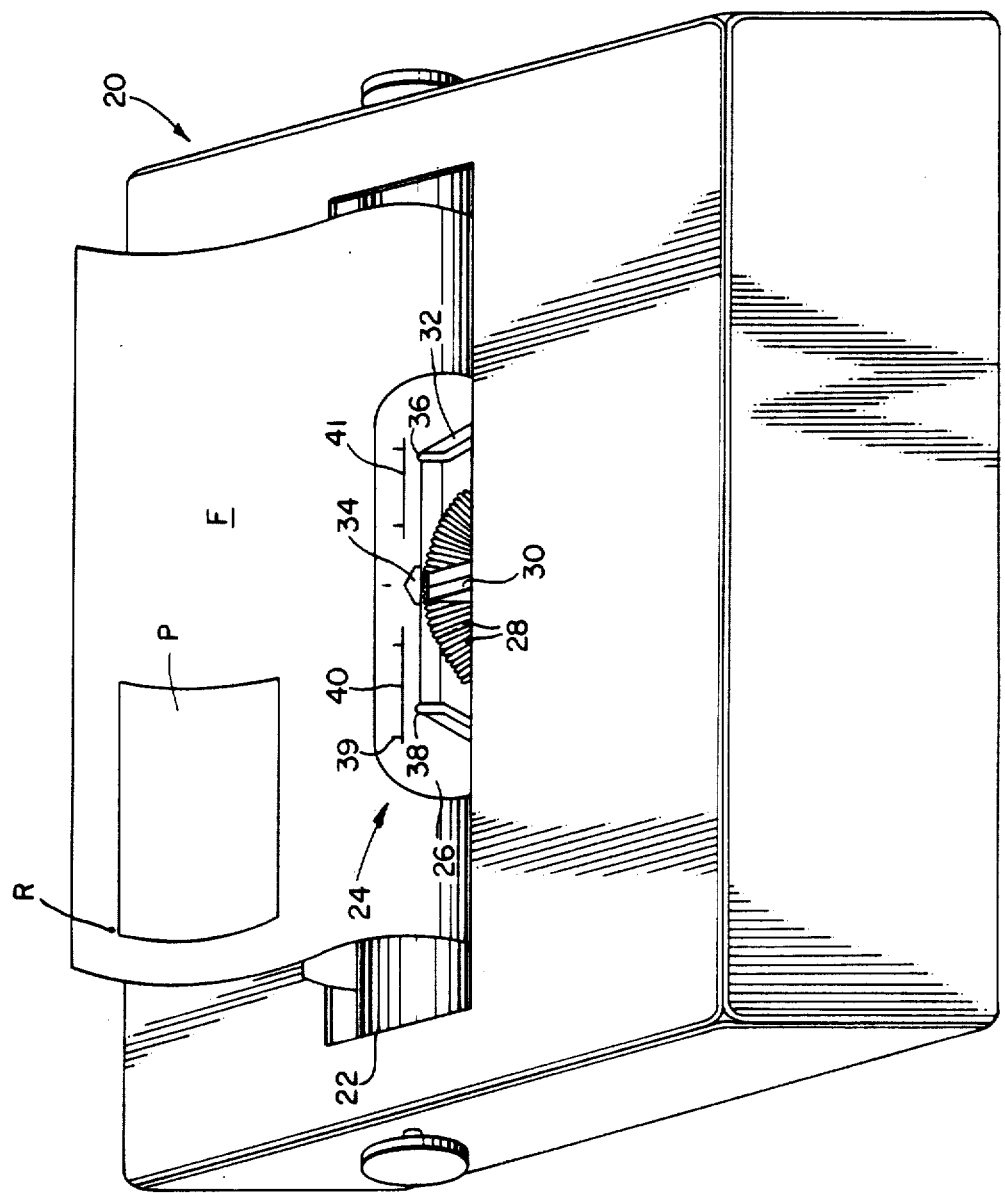
FIG. 2 is a diagrammatic perspective view of a printer containing a pre-printed form.

FIG. 2 shows printer 20 in further detail with a pre-printed form F loaded therein. The form F has a pre-printed region P which is illustrated more closely in FIG. 3. As seen in FIG. 3, the region P contains a plurality of parallel print lines 42a–42g where character data may be inserted to complete the form. (Note that print lines 42e and 42f are shown as dashed lines since they would not actually be visible to the user.) More particularly, each print line has one or more blank fields wherein corresponding character data is to be printed, there being 12 fields total, designated f1–f12. Line 42c, for example, contains three fields f3–f5 for the entry of a city, state and zip code, and line 42e contains two fields f7 and f10 in the form of boxes which may be completed by a single character "x" or the like.

Referring again to FIG. 2, it will be seen that when the form F is loaded into printer 20, it is held between a platen 22 and a plastic card guide 26. Card guide 26 is part of a partially visible print carrier 24 which further includes a plurality of print elements such as 28 in a typical daisywheel-type arrangement. To effect printing, the print elements are rotated past a print head 30 of the carrier, which houses a hammer for selectively striking the print elements in accordance with instructions received from computer 10 via link 16. The printing elements, when struck, impact an inked ribbon 32 which, in turn, impacts the form F through a window 34 in card guide 26. Ribbon 32 is supported in the conventional manner by ribbon guides 36 and 38 which are situated in fixed positions on the print carrier, as are card guide 26 and print head 30.

To permit relative movement of the form and print head along the print lines 42a–42g for the printing of lines of characters, printer 20 includes reversible form advance and print carrier drives (not shown). These features are standard on the Sprint Micro 3 printer, the indices of both drive means, form advance (vertical motion) and print carrier (horizontal motion), being programmable. As will be discussed shortly, the invention makes use of the programmable horizontal motion index feature, which provides the capability of moving print carrier 24 (more to the point, print head 30) along each print line at 10, 12 or 15 CPI as well as at very fine distance increments (e.g., 1/60 inch) which are substantially smaller than the average character width at any of the three available CPI densities.

Having described the basic features of the system of FIG. 1 and the exemplary pre-printed form F, it is now appropriate to address in detail the method for defining the print locations of blank fields f1–f12 independently of a CPI density and the method for accurately printing corresponding character data in those fields at selected CPI densities in accordance with the invention.

An illustrative computer program for implementing these methods in the system of FIG. 1 appears in the form of a source code listing (in BASIC computer language) at the Appendix to this specification, incorporated herein by reference. To facilitate understanding of the invention, the program is directed to relatively simple forms having 6 print lines per inch (LPI) and containing up to 12 blank fields, the lengths of which are to be defined at 12 CPI. The methods embodied in the program are easily adapted to more complex forms, however, as will be apparent to those skilled in the art. Likewise, the detailed operation of the program will be apparent to those skilled in the art from the extensive internal documentation included therein. Therefore, the discussion will be limited to general aspects of the program, and the reader is referred to the program listing for further details. In referring to the program listing, the reader may find the following table of assistance. The table breaks the program down into sections (which are demarcated at the right margin of the program listing) and indicates generally the function of each section. References to these sections will appear in the ensuing discussing as appropriate for guidance.

| ILLUSTRATIVE COMPUTER PROGRAM | |
|---|---|
| Section | Function |
| I | Initialization |
| II | Menu of operator options (define form, save form, etc ) |
| III | Field length definition |
| IV | Save defined form on disk |
| V | Load defined form from disk |
| VIA | Commands to control printer from terminal keyboard |
| VIB | List keys for printer control, locate print head and reference mark at form reference location, and determine positional relation of print head and reference mark |
| VIC | List keys for printer control to define field locations and proceed with defining locations |
| VID | Subroutine for defining print locations |
| VIE | Field confirmation subroutines |
| VIF | Subroutines for printer control in response to operator commands and storage of field locations |
| VII | Data entry |
| VIII | List of printer code variables |
| IX | Selection of printer for print-out |
| X | Printer codes table |
| XI | Order fields for print-out |
| XII | Load form in printer, align print head with reference location, determine actual print positions and print data in fields |
| XIII | Select CPI density, select LPI density to match form, calculate conversion factor for field distances from form reference |
| XIV | Miscellaneous subroutines |

Before executing the computer program, the system operator reviews the pre-printed form F which contains the 12 fields f1-f12 along print lines 42a-42g (assumed to be spaced at 6 LPI), as shown in FIG. 3. The desired length of each field is noted as a number of characters at 12 CPI, and the form F is manually loaded into printer 20 with its print lines positioned so that they will each align with print head 30 as the form is advanced through the printer (at 6 LPI). Horizontal scribe lines 40 and 41 (on card guide 26) of the type found on many typewriters may be used to assist the operator in aligning the form. Once the form is properly loaded in the printer, the operator is prepared to execute the program.

The method for defining the print locations of the fields according to the invention is part of a form generation procedure within the program for entering form F into the computer system. The generation procedure begins with a field definition routine whereby the system operator keys in the previously determined lengths of fields f1-f12 at terminal 12 (see Program, Section III). Thereafter, to finalize the general print-out format of form F, the print locations of the fields along the respective print lines are defined independently of CPI density in accordance with the invention.

Basically, in the preferred form of the invention, CPI density independence is achieved through defining the field print locations by moving print carrier 24 relative to form F to determine the respective numbers of 1/60-inch increments print head 30 must travel in the direction of the print lines relative to a reference location R (on the form) in order to be positioned at the desired print location for the first character position in each field. It is noted that for convenience, reference location R has been selected at the top left character position within the printable area of the form, substantially at the intersection of the top and left margins, as shown in FIGS. 2 and 3.

To make the aforementioned distance determinations, it would ideally be desired to position print head 30 first at reference location R and then at each of the desired field print locations and to record the appropriate numbers of distance increments. Printer 20, however, like many other printers, is constructed in such a manner that an operator cannot accurately predict the actual location of a printed character merely by looking at the print head. Therefore, the foregoing technique is not practicable. The invention accommodates this problem by permitting the operator to select an easily visible reference mark which is fixed on print carrier 24 relative to print head 30 and to position the reference mark (which may be the print head itself on some printers) at the desired print locations. For reasons which will be apparent hereinafter, the reference mark selected in the present embodiment of the invention should be situated relative to print head 30 such that both the mark and the print head may be positioned at reference location R. A vertical scribe mark such as 39 on card guide 26 or the ribbon guide 38 is preferred for this purpose.

With the preceding general discussion in mind, the following procedure for defining the field print locations will now be fully appreciated. First, the operator enters appropriate keystrokes at terminal 12 to cause the required relative movement of print carrier 24 and form F to position print head 30 at reference location R. The computer program generates the appropriate codes for operating the printer in response to the keyed commands and permits the operator to confirm the actual print head location by printing a character, while two counters within the program respectively increment once for each 1/60-inch movement of print carrier 24 along the print lines and once for each line feed to maintain a record of the print head position (see Program, Section VIB, lines 1400 et seq; and Section VIF). The counter readings with the print head positioned at reference location R are stored.

Next the operator enters the appropriate keystrokes to position the selected reference mark on the print carrier at location R (scribe mark 39 will be used by way of example). Because the reference mark 39 is fixed relative to print head 30, the difference in the program counter readings for the current position of print carrier 24 and for the previous position thereof (with print head 30 located at reference R) precisely indicates the positional relationship between the reference mark and the print head. This positional relationship is stored for use in confirming the field print locations, as will be discussed later, and the program counters are reinitialized to define the reference location (see Program, Sections VIB and VIF).

Finally, the operator enters the appropriate keystrokes to position reference mark 39 successively at the desired print locations for the first character position in each field f1-f12. During this process, the program counters provide a continuous record of the position of reference mark 39 relative to reference location R. Thus, for each of the successive positions of the reference mark, the counters indicate, respectively, the number of lines (at 6 LPI) and the number of 1/60-inch increments in the direction of the print lines between the corresponding desired print location and reference location R (which is defined by the initialized counter readings). The counter readings are stored for each desired print location, thereby defining the field locations (see Program, Sections VID and VIF).

While it should be apparent that it is not strictly necessary to determine the positional relationship between print head 30 and reference mark 39 to define the field print locations, this step does make available a particularly advantageous feature for the operator whereby the location of each field may be confirmed prior to storage. In particular, at any time during print location definition, the operator may confirm the position of the reference mark by causing a character to be printed at that position. Upon receipt of the appropriate keyed command from the operator, the program generates the requisite codes (using the aforementioned positional relationship) to locate print head 30 at the position of reference mark 39 relative to the form, to print a single character or a string of characters spanning the defined length of the field being confirmed, and then to relocate the print head to its position prior to the confirmation. Obviously, the reference mark is also returned to its initial position. The single confirmation character or the first character in the confirmation string will be printed at the first character position in the field as indicated by the initial position of the reference mark. The operator is thus able to ascertain with certainty that the reference mark 39 has been accurately positioned for defining the print location of each field, without interruption of the field definition process (see Program, Section VIE).

After the operator has completed the field location definition process, the field parameters (length and print location) are saved on disk or other suitable medium for subsequent data entry and print-out, thereby concluding the form generation procedure (see Program, Section IV). At this point, the operator has generated a computerized representation of the format of fields f1-f12 on form F with each field location along its corresponding print line defined as a distance, independently of CPI density.

To enter data on the now computerized form, the operator calls the form from disk and then enters data corresponding to each field in a conventional manner (see Program, Sections V and VII). It is noted that data entry and print-out may be conducted on the computer system of FIG. 1 or on another computer system capable of running the appended program but having a different CPI density printer, as will now be described.

In accordance with the invention, a data print-out can be accomplished accurately on any suitable printer (controllable by the program) having a CPI density greater than or equal to 12 CPI, the density at which the lengths of fields f1-f12 were defined. It is noted that a lesser CPI density is not desirable since the resulting print-out could overrun the desired field boundaries. The appended program permits selection from four such printers: the Qume Sprint Micro 3, the Texas Instruments Omni 810, the Epson MX-80-III, RX-80, FX-80 and the Anadex DP-9501. The codes necessary to permit operational control of these printers by the program appear in the program listing (see Program, Sections IX and X). Naturally, the particular printers just mentioned are exemplary only, and many other printers could also be employed by incorporating the appropriate codes into the program.

To obtain a print-out of the previously entered character data on a blank form F, the operator first selects one of the four printers noted, whereupon the program selects the corresponding printer codes and sets up the LPI and CPI codes for completion of the form. The LPI code is set to match the form definition 6 LPI (some printers have more than one LPI capability), and a CPI code is selected which most closely matches but is not less than the form definition 12 CPI. A conversion factor for converting the numbers of 1/60-inch distance increments defining the field print locations to corresponding character column positions at the selected CPI density is also calculated—that is, the number of distance increments per character at the selected CPI density (see Program, Section XIII). Next, the operator places a blank form F in the selected printer and aligns the print head with the reference location R on the form. The print head will initially be located at the form's left margin in the ordinary case so that the form may be aligned by manually advancing it through the printer in a conventional manner. To ensure proper alignment of the form, a character may be printed to confirm the position of the print head (see Program, Section XII). Print-out may proceed after the form has been properly loaded as just described.

As will now be explained, the invention permits an accurate print-out on form F regardless of the selected CPI density. This is accomplished by calculating an actual printable location (character column) at the selected CPI density closest to the previously defined print location for the first character in each field. The data corresponding to each field is printed with the first character position at the corresponding determined printable location (see Program, Section XII, lines 4050 et seq).

In further detail, to calculate the actual print location for a given field, the program starts with the number of distance increments defining the desired print location of that field as specified during the form generation procedure. This number is then converted to a character position by multiplication by the aforementioned conversion factor. The result is rounded to the nearest printable character position (i.e., character column). Upward rounding is used in the appended program where the result lies equally between two character positions. After the actual print location has been determined, the print head is tabbed to that location and the corresponding data is printed on form F beginning at that location. The calculation and printing process is repeated for each field on a given print line. Thereafter, form F is advanced to the next print line and print head 30 is returned to its left margin position and the foregoing process is repeated for the fields on the new print line.

By way of example, suppose that the system operator has selected the Texas Instruments printer (10 and 16.5 CPI capability) for completing form F and that field fl is defined as beginning at 90 1/60-inch increments from reference location R in the direction of the print lines (i.e., one and one-half inches from the left margin). In this case, the computer would select 16.5 CPI printing to complete the form. Thereafter, to print corresponding data in field fl, the program would advance form F from its initial loaded position to align print head 30 with print line 42a. Next, the program would calculate the printable character location nearest to one and one-half inches from the left margin of form F. At the selected 16.5 CPI, this distance corresponds to 24.75 character positions, and the program would round this result to the 25th character position for printing purposes. Thus, the data for field fl would be printed beginning 25 character positions from the left margin of form F. The remaining fields f2-f12 would be completed in a similar manner. It is noted that the 25th character position calculated at 16.5 CPI corresponds to about 90.9 1/60-inch increments so that the printed data in field fl would start at only 0.9/60 inches from the desired location specified by the system operator. The data for the remaining fields will be printed with similar accuracy.

From the foregoing discussion, it will be apparent that by virtue of the invention, computerized systems for completing pre-printed forms can be made available to many businesses, etc. which have heretofore been unable to use such systems due to the lack of a compatible printer. Furthermore, the invention will provide current users of such systems with the flexibility to choose printers having capabilities dictated by business needs rather than the peculiar requirements of a particular form completion system.

While the invention has been described herein with respect to a single embodiment, it will be apparent to those skilled in the art that many changes and modifications may be made within the scope of the invention as set forth in the accompanying claims. For example, it is apparent that form reference locations other than the top left corner may be used and that the selected character position for defining the field print locations need not be the first character position in each field. Furthermore, distance increments other than 1/60 inch may also be used. Notably, smaller increments will provide increased printing accuracy.

I claim as my invention:

1. A method for formatting the printout of character data on a pre-printed form containing a plurality of parallel print lines with blank fields to be completed by the printing of stored character data therein, the respective lengths of the blank fields being defined by corresponding numbers of characters at a particular character per inch density, said method comprising:
   providing a computer controlled printing system including a printer having a print carrier with a print head, means for holding said pre-printed form for the printing of lines of characters thereon by said print head and means for causing relative movement of said print carrier and said form along said print lines in distance increments which are small relative to the average character width at said particular character per inch density,
   placing said pre-printed form in said form holding means,
   selecting a visible reference mark on said print carrier, said reference mark being fixed in relation to said print head,
   selecting a reference location on said form,
   defining the position of said reference location in the direction of said print lines by a corresponding number of distance increments,
   causing relative movement of said print carrier and said form to position said reference mark successively at the desired print location on said form for a selected character position within each of said blank fields to be completed,
   determining from said movement the number of distance increments, in the direction of said print lines, between each of said print locations and said reference location, and
   storing the resulting numbers of distance increments, whereby the locations of the blank fields along said print lines are defined independently of character per inch density by corresponding numbers of distance increments.

2. The method of claim 1, wherein said reference mark is successively positioned at the desired print location of the first character position in each blank field to be completed.

3. The method of claim 1, wherein said defining said reference location comprises causing relative movement of said print carrier and said form to position said reference mark at said reference location and initializing a distance increment counter, and wherein said determining the number of distance increments comprises counting the number of distance increments, in the direction of said print lines, between said reference mark and said reference location as said reference mark is successively positioned at each desired print location.

4. The method of claim 1, wherein said reference mark is one of a ribbon guide on said print carrier and a scribe mark located on a card guide of said print carrier.

5. The method of claim 1, wherein said distance increments are no more than about 1/60 of an inch.

6. The method of claim 1, wherein said reference location is substantially at the intersection of the top and left margins of said form.

7. The method of claim 1, further comprising determining the positional relationship between said reference mark and said print head for permitting said print head to be selectively positioned at each print location, as indicated by the corresponding position of said reference mark, in order to confirm that location by printing a character thereat.

8. The method of claim 7, wherein said determining of said positional relationship includes causing relative movement of said print carrier and said form to position said print head at said reference location, causing further relative movement to position said reference mark at said reference location, and ascertaining the positional relationship between the resulting locations of the print head.

9. The method of claim 7, wherein a print location may be confirmed by printing a plurality of characters spanning the defined length of the corresponding field, including a character printed at the desired print location.

10. A method for accurately printing character data at a selected character per inch density on a preprinted form containing a plurality of parallel print lines with blank fields to be completed by the printing of corresponding character data therein, the respective lengths of the blank fields being defined by corresponding numbers of characters at a particular character per inch density not exceeding said selected character per inch density, said method comprising:

providing a computer controlled printing system including a printer having means for printing lines of characters said selected character per inch density and means for holding said pre-printed form for the printing of lines of characters thereon by said printing means, the location of each blank field along its corresponding print line being stored in said system as a number of distance increments, in the direction of that print line, between the desired print location of a selected character position in that field and a reference location on said form, said distance increments being small relative to the average character width at said particular character per inch density, and for each blank field to be completed, determining from the corresponding stored number of distance increments and from the selected character per inch density a printable character location nearest the desired print location for said selected character position of that field and printing the corresponding character data at the selected character per inch density with said selected character position of that field at the determined printable location.

11. The method of claim 10, wherein said determining includes multiplying the corresponding stored number of distance increments by the number of chracters per distance increment at the selected character per inch density.

12. The method of claim 10, wherein said reference location is substantially at the intersection of the top and left margins of said form.

13. The method of claim 10, wherein said selected character position is the first character position in each field.

14. A method of formatting and accurately completing the printout of character data on a pre-printed form containing a plurality of parallel print lines with blank fields to be completed by the printing therein of corresponding character data, the respective lengths of the blank fields being defined by corresponding numbers of characters at a particular character per inch density, said method comprising:

providing a computer controlled printing system including a printer having a print carrier with a print head, means for holding a pre-printed form for the printing of lines of characters thereon by said print head at a selected character per inch density greater than or equal to said particular character per inch density and means for causing relative movement of the print carrier and the form along the print lines in distance increments which are small relative to the average character width at said particular character per inch density, placing said pre-printed form in said form holding means, selecting a visible reference mark on said print carrier, said reference mark being fixed in relation to said print head, selecting a reference location on said form, defining the position of said reference location in the direction of said print lines by a corresponding number of distance increments, causing relative movement of said print carrier and said form to position said reference mark successively at the desired print location on said form for a selected character position within each of the blank fields to be completed, determining from said movement the number of distance increments, in the direction of said print lines, between each of said desired print locations and said reference location, thereby defining the locations of the blank fields along the print lines independently of character per inch density, determining from the respective number of distance increments determined for each desired print location and from the selected character per inch density a printable character location nearest that desired print location, and printing corresponding character data in each field at the selected character per inch density with the selected character position for that field at the corresponding determined printable location.

15. The method of claim 14, wherein said selected character position is the first character position in each field.

16. The method of claim 14, wherein the selected reference location on said form is substantially at the intersection of the top and left margins of said form.

17. The method of claim 14, further comprising determining the positional relationship between said reference mark on said print carrier and said print head for permitting the print head to be selectively positioned at each successive position of said reference mark relative to said form in order to confirm the corresponding desired print location by printing a character thereat.

18. The method of claim 17, wherein said determining of said positional relationship includes positioning said print head at said reference location, positioning said print carrier so that said reference mark is positioned at said reference location, and ascertaining the positional relationship between the resulting locations of the print head.

19. In a computerized system for formatting the printout of character data on a pre-printed form containing a plurality of parallel print lines having blank fields to be completed by the printing therein of corresponding character data, the respective lengths of the blank fields being defined by corresponding numbers of characters at a particular character per inch density, apparatus for defining the locations of the blank fields along the respective print lines independently of character per inch density so as to permit completion of the fields at a selected character per inch density greater than or equal to said particular density, said apparatus comprising:

a printer having a print carrier with a print head and means for holding a pre-printed form for the printing of lines of characters theron by said print head, a visible reference mark on said print carrier in fixed relation to said print head, means for causing relative movement of said print carrier and said form along said print lines in distance increments which are small relative to the average character width at said particular character per inch density, whereby said reference mark may be successively positioned at the desired print location on said form for a selected character position within each blank field to be completed, means for determining from the successive positioning of said reference mark the number of distance increments, in the direction of said print lines, between each desired print location and a selected reference location on said form, and means for storing the resulting numbers of distance increments.

20. Apparatus in accordance with claim 19, wherein said selected character position is the first character position in each field.

21. Apparatus in accordance with claim 19, wherein said determining means includes counter means for counting the number of distance increments between said reference mark and said reference location as said reference mark is successively positioned at each desired print location.

22. Apparatus in accordance with claim 19, wherein said visible reference mark is one of a ribbon guide on said print carrier and a scribe mark on a card guide on said print carrier.

23. Apparatus in accordance with claim 19, wherein said distance increments are not more than about 1/60 of an inch.

24. Apparatus in accordance with claim 19, wherein the selected reference location on said form lies substantially at the intersection of the top and left margins of said form.

25. Apparatus in accordance with claim 19, further comprising means for determining the positional relationship between said reference mark and said print head, whereby said print head may be selectively positioned at each of the successive positions of said reference mark relative to said form for printing characters to confirm the corresponding desired print locations.

26. In a computerized system for printing character data on a pre-printed form containing a plurality of parallel print lines with blank fields to be completed by the printing therein of corresponding character data, the respective lengths of the blank fields being defined by corresponding numbers of characters at a particular character per inch density and the respective locations of the blank fields along the corresponding print lines being defined by numbers of distance increments, in the direction of the print lines, between the desired print location for a selected character position in each field and a reference location on the form, said distance increments being small relative to the average character width at said particular character per inch density, apparatus for accurately printing corresponding character data in the blank fields at a selected character per inch density greater than or equal to said particular density, said apparatus comprising:

a printer having means for holding a pre-printed form and means for printing lines of characters on said form at said selected character per inch density, means for determining from the respective number of distance increments defining each field location and from the selected character per inch density a printable character location nearest the desired print location for the selected character position in that field, and means for causing said printer to print corresponding character data in each field at the selected character per inch density with the selected character position for that field at the corresponding determined printable location.

27. Apparatus in accordance with claim 26, wherein said determining means includes means for multiplying the respective numbers of distance increments by the number of characters per distance increment at the selected character per inch density.

28. Apparatus in accordance with claim 26, wherein said selected character position is the first character position in each field.

29. In a computerized system for printing character data on a pre-printed form containing a plurality of parallel print lines having blank fields to be completed by the printing therein of corresponding character data, the respective lengths of the blank fields being defined by corresponding numbers of characters at a particular character per inch density, apparatus for defining the locations of the blank fields along the print lines independently of character per inch density and for accurately printing corresponding character data in the blank fields at a selected character per inch density greater than or equal to said particular density, said apparatus comprising:

a printer having means for holding a pre-printed form and a print carrier with a print head for printing lines of characters on said form at said selected density, a visible reference mark on said print carrier in fixed relation to said printed head, means for causing relative movement of said print carrier and said form along said print lines in distance increments which are small relative to the average character width at said particular character per inch density, whereby said reference mark may be successively positioned at the desired print location on said form for a selected character position within each blank field to be completed, means for determining from the successive positioning of said reference mark the number of distance increments, in the direction of said print lines, between each desired print location and a selected reference location on said form, means for determining from the respective number of distance increments determined for each desired printed location and from said selected character per inch density a printable character location nearest that desired print location, and means for causing said printer to print corresponding character data in each field with the selected character position for that field at the corresponding determined printable location.

30. Apparatus in accordance with claim 29, further comprising means for determining the positional relationship between said reference mark and said print head, whereby said print head may be selectively positioned at each of the successive positions of said reference mark relative to said form for printing characters in order to confirm the corresponding desired print locations.

31. Apparatus in accordance with claim 29, wherein the selected character position is the first character position.

32. Apparatus in accordance with claim 29, wherein said reference location is substantially at the intersection of the top and left margins of said form.

33. Apparatus in accordance with claim 29, wherein said distance increments are no more than about 1/60 of an inch.

* * * * *

UNITED STATES PATENT AND TRADEMARK OFFICE
CERTIFICATE OF CORRECTION

PATENT NO. :   4,658,366
DATED      :   April 14, 1987
INVENTOR(S) :  David R. POSH It is certified that error appears in the above-identified patent and that said Letters Patent is hereby corrected as shown below:

In column 9, after line 47, insert the computer program appendix appearing on the pages attached hereto.

Signed and Sealed this

Third Day of November, 1987

*Attest:*

*Attesting Officer*

DONALD J. QUIGG

*Commissioner of Patents and Trademarks*

Patent No. 4,658,366

INVENTOR: DAVID R. POSH

TITLE OF INVENTION: METHODS AND APPARATUS FOR ACCURATELY COMPLETING PRE-PRINTED FORMS

APPENDIX

Demonstration of print processes

PAGE 1
07-26-84
11:04:26
IBM Personal Computer BASIC Compiler V1.00

| Offset | Data | Source Line | |
|---|---|---|---|
| 001A | 0002 | ' $LINESIZE: 132 $TITLE: 'Demonstration of print processes' | |
| 001A | 0002 | ' (C)Copyright FormFill 1984 | |
| 001A | 0002 | DEFINT A-Z | |
| 001A | 0002 | WIDTH LPRINT 255 | |
| 002B | 0002 | DIM FLDPROMPT$(12),FLDLEN(12),PRTLIN(12),PRTPOS(12) | |
| 002B | 0084 | DIM FLDNUM(12),TMPLIN(12),TMPPOS(12) | |
| 002B | 00D2 | DIM CPI.VAL!(4),CPI.CODE$(4) | |
| 002B | 00FA | DIM FLD$(12) | |
| 002B | 012E | DIM CMD$(11) | I |
| 002B | 015E | PRNTNAME$="" | |
| 002B | 015E | FLD.DEFINED=0 | |
| 002B | 015E | PRT.DEFINED=0 | |
| 002B | 015E | PRTR.SELECTED=0 | |
| 002B | 015E | NCPIREQ=12 | |
| 002B | 015E | NLPIREQ=6 | |
| 002B | 015E | O$=CHR$(0) | |
| 002B | 015E | ESC$=CHR$(27): RET$=CHR$(13) | |
| 002B | 015E | CLFT$=CHR$(29): CRGHT$=CHR$(28): CUP$=CHR$(30): CDN$=CHR$(31) | |
| 002B | .015E | LFT$=O$+CHR$(75): RGHT$=O$+CHR$(77): UP$=O$+CHR$(72): DN$=O$+CHR$(80) | |
| 002B | 015E | 110 CLS | |
| 00DA | 0198 | PRINT "-------Demonstration--------" | |
| 00DA | 0198 | PRINT "Print definition process and" | |
| 00DA | 0198 | PRINT "printing placement process." | |
| 00DA | 0198 | PRINT | |
| 00DA | 0198 | PRINT "(C)Copyright FormFill 1984" | |
| 00DA | 0198 | PRINT | |
| 00DA | 0198 | PRINT | |
| 00DA | 0198 | PRINT "1. Define form (fields)" | |
| 00DA | 0198 | PRINT "2. Define form (print locations)" | |
| 00DA | 0198 | PRINT "3. Save the form to disk" | |
| 00DA | 0198 | PRINT "4. Load a form from disk" | II |
| 00DA | 0198 | PRINT "5. Fill out the form" | |
| 00DA | 0198 | PRINT "6. Select a printer" | |
| 00DA | 0198 | PRINT "7. Print the text" | |
| 00DA | 0198 | PRINT "8. Exit the program" | |
| 00DA | 0198 | PRINT | |
| 00DA | 0198 | 115 INPUT "Enter your choice ",CHOICE | |
| 0150 | 0198 | CHOICE=INT(CHOICE) | |
| 0150 | 0198 | IF CHOICE<1 OR CHOICE>8 GOTO 115 | |
| 0182 | 019A | ON CHOICE GOTO 1000,1300,1200,1250,2000,3000,4000,5000 | |
| 0199 | 019A | ' ------------------------------------------------------------- | |
| 0199 | 019A | | |
| 0199 | 019A | ' DEFINE A FORM | |
| 0199 | 019A | ' ------------- | |
| 0199 | 019A | 1000 PRINT | |
| 0199 | 019A | PRINT "DEFINE A FORM" | |
| 0199 | 019A | PRINT | |
| 0199 | 019A | FOR I=1 TO 12 | III |
| 01B5 | 019A | FLDPROMPT$(I)=""    ' INITIALIZE | |
| 01B5 | 019A | FLDLEN(I)=0 .    ' ALL PARAMETERS | |
| 01B5 | 019A | PRTLIN(I)=0    ' TO ZERO | |
| 01B5 | 019A | PRTPOS(I)=0    ' BEFORE DEFINING | |
| 01B5 | 019A | NEXT I | |
| 01EE | 019C | FOR I=1 TO 12 | |

```
Offset  Data    Source Line

01F4    019C            PRINT "Prompt for field #";I;"=";
01F4    019C            LINE INPUT "";FLDPROMPT$(I)
020C    019C            PRINT "Max length of field #";I;"=";
020C    019C            INPUT "",FLDLEN(I)
0232    019C        NEXT I
0250    019C        FLD.DEFINED=1
0250    019C        GOTO 110
0250    019C    ' -----------------------------------------------------------
0250    019C
0250    019C    ' SAVE THE FORM
0250    019C    ' ----------
0250    019C  1200 PRINT "Save the form to disk"
0259    019C        IF FLD.DEFINED=0 THEN PRINT "You must define the fields first": GOSUB 5100: GOTO 110
0277    019C        IF PRT.DEFINED=0 THEN PRINT "You must define print locations first": GOSUB 5100: GOTO 110
028E    019C        LINE INPUT "Give the form a disk filename:";FORMNAME$
0294    019C        OPEN "O",#1,FORMNAME$
0294    019C        FOR I=1 TO 12
02AF    01A0            PRINT #1,FLDPROMPT$(I)
02AF    01A0            T$=STR$(FLDLEN(I)): PRINT #1,T$                                    IV
02AF    01A0            T$=STR$(PRTLIN(I)): PRINT #1,T$
02AF    01A0            T$=STR$(PRTPOS(I)): PRINT #1,T$
02AF    01A0        NEXT I
030F    01A4        CLOSE #1
030F    01A4        PRINT "FORM SAVED"
030F    01A4        FOR Z=1 TO 32000: NEXT Z
0331    01A6        GOTO 110
0331    01A6    ' -----------------------------------------------------------
0331    01A6
0331    01A6    ' LOAD THE FORM
0331    01A6    ' ----------
0331    01A6  1250 PRINT "Load a form from disk"
0334    01A6        LINE INPUT "Enter the disk filename of the form:";FORMNAME$
0341    01A6        OPEN "I",#1,FORMNAME$
0341    01A6        FOR I=1 TO 12
0350    01A6            LINE INPUT#1,FLDPROMPT$(I)
0361    01A6            LINE INPUT#1,T$: FLDLEN(I)=VAL(T$)
0374    01A6            LINE INPUT#1,T$: PRTLIN(I)=VAL(T$)                                 V
038D    01A6            LINE INPUT#1,T$: PRTPOS(I)=VAL(T$)
03A6    01A6        NEXT I
03C8    01A6        CLOSE #1
03C8    01A6        FLD.DEFINED=1: PRT.DEFINED=1
03C8    01A6        PRINT "FORM LOADED"
03C8    01A6        FOR Z=1 TO 32000: NEXT Z
03F6    01A6        GOTO 110
03F6    01A6    ' -----------------------------------------------------------
03F6    01A6
03F6    01A6    ' DEFINE PRINT LOCATIONS
03F6    01A6    ' ------------------
03F6    01A6  1300 IF FLD.DEFINED=0 THEN PRINT "You must define the fields first": GOSUB 5100: GOTO 110
0410    01A6        PRINT "THE FOLLOWING PRINT DEFINITION REQUIRES A QUME SPRINT MICRO 3 PRINTER."
0410    01A6        PRINT "THE DESIRED CPI IS 12 FOR THE FORM"
0410    01A6        PRINT "THE DESIRED LPI IS 6 FOR THE FORM"                              VIA
0410    01A6        FOR Z=1 TO 32000: NEXT Z
043A    01A6        FOR Z=1 TO 32000: NEXT Z
```

Demonstration of print processes

Offset  Data   Source Line

```
044F    01A6           ' USE QUME SPRINT MICRO 3 PRINTER FOR
044F    01A6           ' SPECIFYING PRINT PLACEMENT
044F    01A6           '
044F    01A6           CMD$(1) =LFT$           ' LEFT
044F    01A6           CMD$(2) =RGHT$          ' RIGHT
044F    01A6           CMD$(3) =UP$            ' UP
044F    01A6           CMD$(4) =DN$            ' DOWN
044F    01A6           CMD$(5) =O$+"C"         ' F9 (1/60 INCH LEFT)
044F    01A6           CMD$(6) =O$+"D"         ' F10 (1/60 INCH RIGHT)
044F    01A6           CMD$(7) =O$+"<"         ' F2 (CONFIRM)
044F    01A6           CMD$(8) =O$+"="         ' F3 (CONFIRM W/CHAR)
044F    01A6           CMD$(9) =O$+">"         ' F4 (CONFIRM FULL FIELD)
044F    01A6           CMD$(10)=O$+"A"         ' F7 (PRINT CHAR AT LOC)
044F    01A6           CMD$(11)=O$+"B"         ' F8 (LOAD LOCATOR)
044F    01A6           PC$="L"                 ' CONFIRMATION CHARACTER
044F    01A6           FORCE$=CHR$(0)+CHR$(0)  ' FORCES PRINTER TO MOVE
044F    01A6           PU$=CHR$(27)+CHR$(10)   ' UP ONE LINE
044F    01A6           PD$=CHR$(10)            ' DOWN ONE LINE
044F    01A6           PL$=CHR$(8)             ' LEFT 1/60 INCH (WHEN INITIALIZED PER LINE 1400)
044F    01A6           PR$=" "                 ' RIGHT 1/60 INCH (WHEN INITIALIZED PER LINE 1400)
044F    01A6           ICT=60/NCPIRE0          ' # OF 1/60ths PER CHARACTER POSITION AT DESIRED CPI
044F    01A6
044F    01A6           ' IDENTIFY LOCATION OF HAMMER & REFERENCE
044F    01A6           ' ----------------------------------------
044F    01A6           1400 LPRINT ESC$;CHR$(159);CHR$(3);RET$;FORCE$; 'SET TO 1/60 INCH MOVEMENT
051C    01C0           PH=0      ' UNTIL HAMMER LOCATED, USE LEFT BUMPER=HORIZONTAL POS OF 0
051C    01C0           PV=100    ' START VERTICAL AT 100 SO THEY HAVE ROOM TO LOCATE HAMMER VERTICALLY
051C    01C0           CLS
051C    01C0           PRINT "Left arrow    moves left 1 character position"
051C    01C0           PRINT "Right arrow   moves right 1 character position"
051C    01C0           PRINT "Up arrow      moves up 1 line"
051C    01C0           PRINT "Down arrow    moves down 1 line"
051C    01C0           PRINT "F9            moves left 1/60 inch"
051C    01C0           PRINT "F10           moves right 1/60 inch"
051C    01C0           PRINT
051C    01C0           PRINT "Locate HAMMER at top left corner, then press enter.";
051C    01C0           1410 GOSUB 8200                   ' GET CHARACTER
0587    01C4           IF LEN(C$)=1 THEN_
0587    01C4               IF C$>" " AND C$<="z" THEN_
0587    01C4                   LPRINT C$;PL$;FORCE$;:_   ' PRINT CHAR TO ASSIST LOCATING HAMMER
0587    01C4                   GOTO 1410
05C8    01C8           IF C$=RET$ GOTO 1430              ' HAMMER IS LOCATED
05D5    01C8           FOR CMD=1 TO 6
05DB    01C8               IF C$=CMD$(CMD) GOTO 1420
05F2    01CA           NEXT CMD
0600    01CA           GOTO 1410
0600    01CA           '            LEFT RGHT UP   DN   F9   F10
0600    01CA           1420 ON CMD GOSUB 1710,1720,1730,1740,1750,1760
0616    01CA           GOTO 1410
0616    01CA
0616    01CA           ' Return
0616    01CA           1430 LPRINT PC$;PL$;FORCE$;       ' PRINT A CONFIRMATION CHARACTER
0619    01CA           SOUND 900,1
0619    01CA           PHSTOR=PH                         ' STORE VALUE FOR HAMMER LOC
```

VIB

Demonstration of print processes

PAGE 4
07-26-94
11:04:26
IBM Personal Computer BASIC Compiler V1.00

| Offset | Data | Source Line |
|---|---|---|
| 0619 | 01CA | PVSTOR=PV                                 ' STORE VALUE FOR HAMMER LOC |
| 0619 | 01CA | PRINT "Locate REFERENCE at top left corner, then press enter."; |
| 0619 | 01CA | 1440 GOSUB 8200                            ' GET CHARACTER |
| 0649 | 01CE | IF C$=RET$ GOTO 1460                      ' REFERENCE IS LOCATED |
| 0656 | 01CE | FOR CMD=1 TO 6 |
| 065C | 01CE |    IF C$=CMD$(CMD) GOTO 1450 |
| 0673 | 01CE | NEXT CMD |
| 0681 | 01CE | GOTO 1440 |
| 0681 | 01CE | '           LEFT RGHT UP   DN   F9   F10 |
| 0681 | 01CE | 1450 ON CMD GOSUB 1710,1720,1730,1740,1750,1760 |
| 0697 | 01CE | GOTO 1440 |
| 0697 | 01CE | |
| 0697 | 01CE | ' Return |
| 0697 | 01CE | 1460 SOUND 900,1                           ' REFERENCE IS LOCATED |
| 069A | 01CE | PREFVIX=PVSTOR-PV                          ' CALCULATE THE DIFFERENCE BETWEEN |
| 069A | 01CE | PREFHIX=PH-PHSTOR                          '    THE HAMMER AND REFERENCE |
| 069A | 01CE | PV=1: PH=1                                 ' RE-INITIALIZE COUNTERS |
| 069A | 01CE | CLS |
| 069A | 01CE | PRINT "Left arrow   moves reference left 1 character position" |
| 069A | 01CE | PRINT "Right arrow  moves reference right 1 character position" |
| 069A | 01CE | PRINT "Up arrow     moves reference up 1 line" |
| 069A | 01CE | PRINT "Down arrow   moves reference down 1 line" |
| 069A | 01CE | PRINT "F9           moves reference left 1/60 inch" |
| 069A | 01CE | PRINT "F10          moves reference right 1/60 inch" |
| 069A | 01CE | PRINT "F2           confirms by moving reference to beginning of field" |
| 069A | 01CE | PRINT "F3           confirms by printing 'L' character at beginning of field" |
| 069A | 01CE | PRINT "F4           confirms by printing 'X' characters in entire field" |
| 069A | 01CE | PRINT "F7           prints character 'L' at location of reference" |
| 069A | 01CE | PRINT "F8           stores location of reference as field location" |
| 069A | 01CE | PRINT "Enter key    proceeds with next field" |
| 069A | 01CE | LOCATE 15,1 |
| 069A | 01CE | PRINT "Locate reference to field #"; |
| 069A | 01CE | PRINT " press F8 to store location, press enter to proceed." |
| 069A | 01CE | LOCATE 18,1: PRINT "Reference is at line    , position    "; |
| 069A | 01CE | |
| 069A | 01CE | FOR FLDPTR=1 TO 12 |
| 074C | 01D2 |    GOSUB 8000                          ' GET FIELD PARAMS |
| 074F | 01D2 |    LOCATE 15,28: PRINT STRING$(51,32); |
| 074F | 01D2 |    LOCATE 15,28: PRINT FLDPTR;"(";FLDPROMPT$;"),"; |
| 074F | 01D2 |    PRINT " press F8 to store location, press enter to proceed." |
| 074F | 01D2 |    GOSUB 1540                          ' PRINT DEFINITION |
| 0798 | 01D8 | NEXT FLDPTR |
| 07A6 | 01D8 | PRT.DEFINED=1 |
| 07A6 | 01D8 | GOTO 110 |
| 07A6 | 01D8 | |
| 07A6 | 01D8 | ' PRINT DEFINITION OF A FIELD |
| 07A6 | 01D8 | ' --------------------------- |
| 07A6 | 01D8 | 1540 PRINT: PRINT |
| 07AF | 01D8 | GOTO 1565 |
| 07AF | 01D8 | 1550 GOSUB 8200                            ' GET CHARACTER |
| 07C0 | 01D8 | IF C$=CHR$(3) THEN PRINT: PRINT "ABORTED": GOTO 5100 |
| 07E2 | 01D8 | IF C$=RET$ THEN_ |
| 07E2 | 01D8 |    IF PRTLIN<1 OR PRTPOS<1 THEN SOUND 500,2:_ |
| 07E2 | 01D8 |                 GOTO 1550_ |

VIC

VID

Demonstration of print processes

Offset Data  Source Line

```
07E2   01D8                               ELSE PRINT: PRINT:_
081A   01DC                                  RETURN
0826   01DC        FOR CMD=1 TO 11
082C   01DC            IF C$=CMD$(CMD) GOTO 1560     ' C=COMMAND INDEX
0843   01DC        NEXT CMD
0851   01DC        GOTO 1550
0851   01DC   1560 IF CMD>6 GOTO 1570
085E   01DC        '          LFT  RGHT  UP   DN   F9  F10
085E   01DC        ON CMD GOSUB 1710,1720,1730,1740,1750,1760
0871   01DC   1565 LOCATE 18,22: PRINT USING "####";PV;     ' DISPLAY VALUES
0871   01DC        LOCATE 18,37: PRINT USING "####";PH;     ' DISPLAY VALUES
0871   01DC        GOTO 1550
0871   01DC        '          F2   F3   F4   F7   F8
0871   01DC   1570 ON CMD-6 GOTO 1580,1590,1600,1620,1630
08B8   01DC
08B8   01DC        ' F2 - CONFIRM
08B8   01DC        ' ----------
08B8   01DC   1580 IF PRTLIN<1 OR PRTPOS<1 GOTO 1550
08D7   01DC        IF PRTLIN<PV THEN TMP=PV-PRTLIN:FOR I=1 TO TMP: LPRINT PU$;: NEXT I
090D   01E0        IF PRTLIN>PV THEN TMP=PRTLIN-PV:FOR I=1 TO TMP: LPRINT PD$;: NEXT I
0945   01E2        IF PRTPOS<PH THEN TMP=PH-PRTPOS:FOR I=1 TO TMP: LPRINT PL$;: NEXT I
097B   01E4        IF PRTPOS>PH THEN TMP=PRTPOS-PH:FOR I=1 TO TMP: LPRINT PR$;: NEXT I
09B3   01E6        PV=PRTLIN: PH=PRTPOS: LPRINT FORCE$;
09B3   01E6        GOTO 1550
09B3   01E6
09B3   01E6        ' F3 - CONFIRM WITH CHARACTER "L"
09B3   01E6        ' ----------------------------
09B3   01E6   1590 IF PRTLIN<1 OR PRTPOS<1 GOTO 1550
09E8   01E6        IF PRTLIN<PV THEN TMP=PV-PRTLIN: FOR I=1 TO TMP: LPRINT PU$;: NEXT I
0A1E   01E8        IF PRTLIN>PV THEN TMP=PRTLIN-PV: FOR I=1 TO TMP: LPRINT PD$;: NEXT I
0A56   01EA        IF PRTPOS<PH THEN TMP=PH-PRTPOS: FOR I=1 TO TMP: LPRINT PL$;: NEXT I
0A8C   01EC        IF PRTPOS>PH THEN TMP=PRTPOS-PH: FOR I=1 TO TMP: LPRINT PR$;: NEXT I
0AC4   01EE        PV=PRTLIN: PH=PRTPOS
0AC4   01EE        GOSUB 1900                     ' LOAD PRINTHEAD
0AD3   01EE        LPRINT PC$;PL$;
0AD3   01EE        GOSUB 1950                     ' RESTORE PRINTHEAD
0AE2   01EE        GOTO 1550
0AE2   01EE
0AE2   01EE        ' F4 - CONFIRM WITH FIELD OF "X"s
0AE2   01EE        ' ----------------------------
0AE2   01EE   1600 IF PRTLIN<1 OR PRTPOS<1 GOTO 1550
0B04   01EE        IF PRTLIN<PV THEN TMP=PV-PRTLIN: FOR I=1 TO TMP: LPRINT PU$;: NEXT I
0B3A   01F0        IF PRTLIN>PV THEN TMP=PRTLIN-PV: FOR I=1 TO TMP: LPRINT PD$;: NEXT I
0B72   01F2        IF PRTPOS<PH THEN TMP=PH-PRTPOS: FOR I=1 TO TMP: LPRINT PL$;: NEXT I
0BA8   01F4        IF PRTPOS>PH THEN TMP=PRTPOS-PH: FOR I=1 TO TMP: LPRINT PR$;: NEXT I
0BE0   01F6        PV=PRTLIN: PH=PRTPOS
0BE0   01F6        GOSUB 1900                     ' LOAD PRINT HEAD
0BEF   01F6   1610 IF (PH MOD ICT)>1 THEN GOSUB 1760:_' 1/60 INCH RIGHT
0C02   01F6                            GOTO 1610
0C05   01F6        FOR I=1 TO FLDLEN
0C11   01FA            LPRINT "X";SPACE$(ICT-1);       ' PRINT Xs
0C11   01FA        NEXT I
0C32   01FA        FOR I=1 TO FLDLEN
0C3E   01FC            LPRINT STRING$(ICT,PL$);        ' BACKUP TO BEGINNING OF FIELD
```

VIE

Demonstration of print processes

Offset  Data   Source Line

```
0C3E    01FC       NEXT I
0C5C    01FC       GOSUB 1950                        ' RESTORE PRINT HEAD
0C5F    01FC       GOTO 1550
0C5F    01FC
0C5F    01FC       ' F7 - PRINT "L" AT LOCATION
0C5F    01FC       ' ---------------------------
0C5F    01FC  1620 GOSUB 1900                        ' LOAD PRINTHEAD
0C65    01FC       LPRINT PC$;PL$;FORCE$;
0C65    01FC       GOSUB 1950                        ' RESTORE PRINTHEAD
0C79    01FC       GOTO 1550
0C79    01FC
0C79    01FC       ' F8 - STORE LOCATION OF REFERENCE
0C79    01FC       ' ---------------------------------
0C79    01FC  1630 PRTLIN=PV
0C7C    01FC       PRTPOS=PH
0C7C    01FC       GOSUB 8100                        ' STORE PARAMETERS
0C8B    01FC       SOUND 1200,1
0C8B    01FC       GOTO 1550
0C8B    01FC
0C8B    01FC       ' LEFT
0C8B    01FC       ' ----
0C8B    01FC  1710 IF PH<=1 THEN RETURN
0CA2    01FC       LPRINT PL$;FORCE$;
0CA2    01FC       PH=PH-1
0CA2    01FC       IF PH MOD ICT<>0 GOTO 1710        ' REPEAT UNTIL AT CHAR POSITION
0CC1    01FC       RETURN
0CC1    01FC
0CC1    01FC       ' RIGHT
0CC1    01FC       ' -----
0CC1    01FC  1720 IF PH>792 THEN RETURN
0CCE    01FC       LPRINT PR$;FORCE$;
0CCE    01FC       PH=PH+1
0CCE    01FC       IF PH MOD ICT<>0 GOTO 1720        ' REPEAT UNTIL AT CHAR POSITION
0CED    01FC       RETURN
0CED    01FC
0CED    01FC       ' UP
0CED    01FC       ' --
0CED    01FC  1730 IF PV<=1 THEN RETURN
0CF9    01FC       LPRINT PU$;FORCE$;
0CF9    01FC       PV=PV-1
0CF9    01FC       RETURN
0CF9    01FC
0CF9    01FC       ' DOWN
0CF9    01FC       ' ----
0CF9    01FC  1740 LPRINT PD$;FORCE$;
0D0D    01FC       PV=PV+1
0D0D    01FC       RETURN
0D0D    01FC
0D0D    01FC       ' F9 1/60 LEFT
0D0D    01FC       ' ------------
0D0D    01FC  1750 IF PH<=1 THEN RETURN
0D2C    01FC       LPRINT PL$;FORCE$;
0D2C    01FC       PH=PH-1
0D2C    01FC       RETURN
```

VIF

Demonstration of print processes

```
Offset  Data    Source Line

0D2C    01FC
0D2C    01FC            ' F10 1/60 RIGHT
0D2C    01FC            ' ---------------
0D2C    01FC    1760 IF PH>792 THEN RETURN
0D4C    01FC            LPRINT PR$;FORCE$;
0D4C    01FC            PH=PH+1
0D4C    01FC            RETURN
0D4C    01FC
0D4C    01FC            ' LOAD PRINTHEAD
0D4C    01FC            ' --------------
0D4C    01FC            ' prefhix: (-) move right to print, (+) move left to print
0D4C    01FC            ' prefvix: (-) move up    to print, (+) move down to print
0D4C    01FC    1900 IF PREFVIX<0 THEN FOR I=PREFVIX TO -1: LPRINT PU$;: NEXT I
0D85    01FC            IF PREFVIX>0 THEN FOR I=1 TO PREFVIX:  LPRINT PD$;: NEXT I
0DB2    01FE            IF PREFHIX<0 THEN FOR I=PREFHIX TO -1: LPRINT PR$;: NEXT I
0DD7    01FE            IF PREFHIX>0 THEN FOR I=1 TO PREFHIX:  LPRINT PL$;: NEXT I
0E04    0200            LPRINT FORCE$;
0E04    0200            RETURN
0E04    0200
0E04    0200            ' RESTORE PRINTHEAD
0E04    0200            ' -----------------
0E04    0200            ' prefhix: (-) move left to restore, (+) move right to restore
0E04    0200            ' prefvix: (-) move down to restore, (+) move up    to restore
0E04    0200    1950 IF PREFVIX<0 THEN FOR I=PREFVIX TO -1: LPRINT PD$;: NEXT I
0E31    0200            IF PREFVIX>0 THEN FOR I=1 TO PREFVIX:  LPRINT PU$;: NEXT I
0E5E    0202            IF PREFHIX<0 THEN FOR I=PREFHIX TO -1: LPRINT PL$;: NEXT I
0E83    0202            IF PREFHIX>0 THEN FOR I=1 TO PREFHIX:  LPRINT PR$;: NEXT I
0EB0    0204            LPRINT FORCE$;
0EB0    0204            RETURN
0EB0    0204            ' ----------------------------------------------------------
0EB0    0204
0EB0    0204            ' FILL OUT THE FORM
0EB0    0204            ' -----------------
0EB0    0204    2000 CLS
0EB8    0204            PRINT "FILL OUT THE FORM"
0EB8    0204            PRINT
0EB8    0204            IF PRT.DEFINED=1 GOTO 2005
0ED3    0204                PRINT "You must define the fields and print locations first"
0ED3    0204                GOSUB 5100: GOTO 110
0EDD    0204    2005 FOR I=1 TO 12
0EE6    0204    2010     PRINT FLDPROMPT$(I);
0EE6    0204                LINE INPUT "";FLD$(I)
0EFC    0204                IF LEN(FLD$(I))>FLDLEN(I) THEN PRINT CHR$(7);"TOO LONG": GOTO 2010
0F2D    0204            NEXT I
0F3B    0204            GOTO 110
0F3B    0204            ' ----------------------------------------------------------
0F3B    0204
0F3B    0204            ' PRNTNAME$         = ASCII NAME
0F3B    0204            ' VMI.SIZE          = NUMBER OF VMI UNITS PER INCH
0F3B    0204            ' VMI.CODE$         = CODES TO CAUSE PRINTER TO MOVE VERTICALLY
0F3B    0204            '                       IN INCREMENTS OF 1 VMI UNIT
0F3B    0204            ' HMI.SIZE          = NUMBER OF HMI UNITS PER INCH
0F3B    0204            ' HMI.CODE$         = CODES TO CAUSE PRINTER TO MOVE HORIZONTALLY
0F3B    0204            '                       IN INCREMENTS OF 1 HMI UNIT
```

VII

VIII

```
Offset  Data    Source Line

0F3B    0204            ' SIXLPI.YN$          = Y,N,or M
0F3B    0204            ' SIXLPI.CODE$        = CODES TO CAUSE PRINTER TO LINE ADVANCE AT
0F3B    0204            '                            6 LINES PER INCH
0F3B    0204            ' EIGHTLPI.YN$        = Y,N,or M
0F3B    0204            ' EIGHTLPI.CODE$      = CODES TO CAUSE PRINTER TO LINE ADVANCE AT
0F3B    0204            '                            8 LINES PER INCH
0F3B    0204            ' CPI.VAL!(1)         = ONE OF UP TO 4 CPI DENSITIES
0F3B    0204            '                            THAT THE PRINTER IS CAPABLE OF PRINTING AT
0F3B    0204            ' CPI.CODE$(1)        = CODES TO CAUSE THE PRINTER TO PRINT AT CPI DENSITY
0F3B    0204            '                            SPECIFIED IN CORRESPONDING CPI.VAL!()
0F3B    0204            ' CPI.VAL!(2)         = SEE CPI.VAL!(1)
0F3B    0204            ' CPI.CODE$(2)        = SEE CPI.CODE$(1)
0F3B    0204            ' CPI.VAL!(3)         = SEE CPI.VAL!(1)
0F3B    0204            ' CPI.CODE$(3)        = SEE CPI.CODE$(1)
0F3B    0204            ' CPI.VAL!(4)         = SEE CPI.VAL!(1)
0F3B    0204            ' CPI.CODE$(4)        = SEE CPI.CODE$(1)
0F3B    0204
0F3B    0204    3000 CLS
0F3E    0204         PRINT "SELECT A PRINTER"
0F3E    0204         PRINT
0F3E    0204         PRINT "1. Qume Sprint Micro 3"
0F3E    0204         PRINT "2. Texas Instruments Omni 810"
0F3E    0204         PRINT "3. Epson MX-80-III, RX-80, FX-80"
0F3E    0204         PRINT "4. Anadex DP-9501"
0F3E    0204         PRINT
0F3E    0204    3010 INPUT "Enter your choice ",CHOICE                               IX
0F79    0204         CHOICE=INT(CHOICE)
0F79    0204         IF CHOICE<1 OR CHOICE>4 GOTO 3010
0FAB    0204         ON CHOICE GOSUB 3100,3200,3300,3400
0FBA    0204         PRINT PRNTNAME$;" now selected"
0FBA    0204         PRTR.SELECTED=1
0FBA    0204         FOR Z=1 TO 32000: NEXT Z
0FE1    0204         GOTO 110
0FE1    0204
0FE1    0204    3100 PRNTNAME$      ="Qume Sprint Micro 3"
0FE4    0204         VMI.SIZE       =48
0FE4    0204         VMI.CODE$      =CHR$(27)+CHR$(30)+CHR$(2)
0FE4    0204         HMI.SIZE       =120
0FE4    0204         HMI.CODE$      =CHR$(27)+CHR$(31)+CHR$(2)
0FE4    0204         SIXLPI.YN$     ="Y"
0FE4    0204         SIXLPI.CODE$   =CHR$(27)+CHR$(30)+CHR$(137)
0FE4    0204         EIGHTLPI.YN$   ="Y"
0FE4    0204         EIGHTLPI.CODE$=CHR$(27)+CHR$(30)+CHR$(7)
0FE4    0204         CPI.VAL!(1)    =10
0FE4    0204         CPI.CODE$(1)   =CHR$(27)+CHR$(31)+CHR$(141)                     X
0FE4    0204         CPI.VAL!(2)    =12
0FE4    0204         CPI.CODE$(2)   =CHR$(27)+CHR$(31)+CHR$(11)
0FE4    0204         CPI.VAL!(3)    =15
0FE4    0204         CPI.CODE$(3)   =CHR$(27)+CHR$(31)+CHR$(137)
0FE4    0204         CPI.VAL!(4)    =0
0FE4    0204         CPI.CODE$(4)   =""
0FE4    0204         RETURN
0FE4    0204
0FE4    0204    3200 PRNTNAME$      ="Texas Instruments Omni 810"
```

Demonstration of print processes

| Offset | Data | Source Line | | |
|---|---|---|---|---|
| 1125 | 0220 | | VMI.SIZE | =0 |
| 1125 | 0220 | | VMI.CODE$ | ="" |
| 1125 | 0220 | | HMI.SIZE | =0 |
| 1125 | 0220 | | HMI.CODE$ | ="" |
| 1125 | 0220 | | SIXLPI.YN$ | ="Y" |
| 1125 | 0220 | | SIXLPI.CODE$ | =CHR$(27)+CHR$(43)+CHR$(52) |
| 1125 | 0220 | | EIGHTLPI.YN$ | ="Y" |
| 1125 | 0220 | | EIGHTLPI.CODE$=CHR$(27)+CHR$(43)+CHR$(53) | |
| 1125 | 0220 | | CPI.VAL!(1) | =10 |
| 1125 | 0220 | | CPI.CODE$(1) | =CHR$(27)+CHR$(54) |
| 1125 | 0220 | | CPI.VAL!(2) | =16.5 |
| 1125 | 0220 | | CPI.CODE$(2) | =CHR$(27)+CHR$(55) |
| 1125 | 0220 | | CPI.VAL!(3) | =0 |
| 1125 | 0220 | | CPI.CODE$(3) | ="" |
| 1125 | 0220 | | CPI.VAL!(4) | =0 |
| 1125 | 0220 | | CPI.CODE$(4) | ="" |
| 1125 | 0220 | | RETURN | |
| 1125 | 0220 | | | |
| 1125 | 0220 | 3300 PRNTNAME$ | ="Epson MX-80-III, RX-80, FX-80" | |
| 11FD | 0220 | | VMI.SIZE | =72 |
| 11FD | 0220 | | VMI.CODE$ | =CHR$(27)+CHR$(65)+CHR$(1) |
| 11FD | 0220 | | HMI.SIZE | =0 |
| 11FD | 0220 | | HMI.CODE$ | ="" |
| 11FD | 0220 | | SIXLPI.YN$ | ="Y" |
| 11FD | 0220 | | SIXLPI.CODE$ | =CHR$(27)+CHR$(50) |
| 11FD | 0220 | | EIGHTLPI.YN$ | ="Y" |
| 11FD | 0220 | | EIGHTLPI.CODE$=CHR$(27)+CHR$(48) | |
| 11FD | 0220 | | CPI.VAL!(1) | =10 |
| 11FD | 0220 | | CPI.CODE$(1) | =CHR$(18) |
| 11FD | 0220 | | CPI.VAL!(2) | =16.7 |
| 11FD | 0220 | | CPI.CODE$(2) | =CHR$(15) |
| 11FD | 0220 | | CPI.VAL!(3) | =0 |
| 11FD | 0220 | | CPI.CODE$(3) | ="" |
| 11FD | 0220 | | CPI.VAL!(4) | =0 |
| 11FD | 0220 | | CPI.CODE$(4) | ="" |
| 11FD | 0220 | | RETURN | |
| 11FD | 0220 | | | |
| 11FD | 0220 | 3400 PRNTNAME$ | ="Anadex DP-9501" | |
| 12C3 | 0220 | | VMI.SIZE | =0 |
| 12C3 | 0220 | | VMI.CODE$ | ="" |
| 12C3 | 0220 | | HMI.SIZE | =0 |
| 12C3 | 0220 | | HMI.CODE$ | ="" |
| 12C3 | 0220 | | SIXLPI.YN$ | ="Y" |
| 12C3 | 0220 | | SIXLPI.CODE$ | =CHR$(27)+CHR$(72) |
| 12C3 | 0220 | | EIGHTLPI.YN$ | ="Y" |
| 12C3 | 0220 | | EIGHTLPI.CODE$=CHR$(27)+CHR$(73) | |
| 12C3 | 0220 | | CPI.VAL!(1) | =10 |
| 12C3 | 0220 | | CPI.CODE$(1) | =CHR$(18) |
| 12C3 | 0220 | | CPI.VAL!(2) | =12.5 |
| 12C3 | 0220 | | CPI.CODE$(2) | =CHR$(25) |
| 12C3 | 0220 | | CPI.VAL!(3) | =15 |
| 12C3 | 0220 | | CPI.CODE$(3) | =CHR$(26) |
| 12C3 | 0220 | | CPI.VAL!(4) | =16.7 |
| 12C3 | 0220 | | CPI.CODE$(4) | =CHR$(20) |

X (cont.)

Demonstration of print processes

| Offset | Data | Source Line |
|---|---|---|

```
12C3  0220           RETURN
12C3  0220
12C3  0220        ' -----------------------------------------------------------------
12C3  0220  4000 IF PRT.DEFINED=1 GOTO 4005
1379  0220           PRINT "You must define the fields and print locations first"
1379  0220           GOSUB 5100: GOTO 110
1383  0220  4005 IF PRTR.SELECTED=1 GOTO 4008
1390  0220           PRINT "You must select a printer first"
1390  0220           GOSUB 5100: GOTO 110
139A  0220  4008 OPEN "LPT1:" AS #9 : WIDTH #9,255
139D  0220  4010 CLS
13B4  0220
13B4  0220        ' CREATE TABLE OF POINTERS REFERENCING PARAMETERS (IN PRINT ORDER)
13B4  0220        FOR I=1 TO 12
13BD  0220            FLDNUM(I)=I: TMPLIN(I)=PRTLIN(I): TMPPOS(I)=PRTPOS(I)
13BD  0220        NEXT I                                                              XI
13E5  0220        FOR J=11 TO 1 STEP -1
13EB  0220            FOR K=1 TO J
13F7  0224              IF TMPLIN(K)<TMPLIN(K+1) GOTO 4015
140A  0226              IF TMPLIN(K)>TMPLIN(K+1) THEN GOSUB 4100: GOTO 4015
1423  0226              ' (same line)
1423  0226              IF TMPPOS(K)<TMPPOS(K+1) GOTO 4015
1436  0226              IF TMPPOS(K)>TMPPOS(K+1) THEN GOSUB 4100: GOTO 4015
144F  0226  4015     NEXT K
145F  0226        NEXT J
1470  0226
1470  0226        GOSUB 4500                    ' SETUP PRINTER CODES
1473  0226
1473  0226        ' PRINT CONTROL
1473  0226        ' ------------
1473  0226        LNNUM=1
1473  0226        PRINT "Ready printer with form"
1473  0226        PRINT "Then hit RETURN (or hit ESC to abort) ";
1473  0226  4020 C$=INKEY$: IF C$="" GOTO 4020
1497  0228        IF C$=ESC$ GOTO 4070
14A4  0228        IF C$=RET$ GOTO 4030
14B1  0228        IF LEN(C$)=1 AND_
14B1  0228           C$>" " AND C$<="z" THEN_       ' PRINT CHAR HELPS ALIGN FORM
14B1  0228                         PRINT #9, PSUCOD$;C$;CHR$(13);
14F8  022C        GOTO 4020
14F8  022C  4030 PRINT " PRINTING IN PROCESS - hit any key to PAUSE "
14FB  022C        PRINT #9, PSUCOD$;CHR$(13);
14FB  022C        FOR I=1 TO 12                                                       XII
151A  022C            K$=INKEY$: IF LEN(K$)=0 GOTO 4050
152D  0230               PRINT "PAUSED - hit ESC to ABORT, any other key to continue printing ";:COLOR 7,0
152D  0230  4040       K$=INKEY$:IF LEN(K$)=0 GOTO 4040
154F  0230            IF K$=ESC$ THEN RETURN
155D  0230            PRINT " PRINTING IN PROCESS - hit any key to PAUSE ";
155D  0230  4050   PRTLIN= PRTLIN(FLDNUM(I))
1564  0230        PRTPOS= PRTPOS(FLDNUM(I))
1564  0230        FLD$  = FLD$(FLDNUM(I))
1564  0230  4060   IF PRTLIN<>LNNUM THEN_        ' ADVANCE LINES
158D  0234           PRINT #9,CHR$(13);CHR$(10);:_
158D  0234           LNNUM=LNNUM+1:_
```

Demonstration of print processes

Offset  Data  Source Line

```
158D   0234                GOTO 4060
15B5   0234                PRINT #9, TAB(INT(PRTPOS*PRTFAC!+.5));FLD$;  ' CALC PRINT POSITION
15B5   0234             NEXT I
15F0   0238             PRINT "Form printed";
15F0   0238        4070 CLOSE #9
15F7   0238             FOR Z=1 TO 32000: NEXT Z
1612   0238             GOTO 110
1612   0238
1612   0238             ' SWAP ENTRIES IN TMP TABLE
1612   0238             ' -----------------------
1612   0238        4100 SWAP FLDNUM(K),FLDNUM(K+1)
1615   0238             SWAP TMPLIN(K),TMPLIN(K+1)
1615   0238             SWAP TMPPOS(K),TMPPOS(K+1)
1615   0238             RETURN
1615   0238
1615   0238             ' SETUP LPI AND CPI CODES
1615   0238             ' -----------------------
1615   0238        4500 IF NLPIREQ=6 AND SIXLPI.YN$="N" GOTO 4550
1675   0238             IF NLPIREQ=8 AND EIGHTLPI.YN$="N" GOTO 4550
1699   0238             CPITRY!=0
1699   0238             FOR CPIX=1 TO 4
16A7   023C                IF CPI.VAL!(CPIX)=NCPIREQ THEN_  ' EXACT MATCH OF CPI DESIRED
16A7   023C                   CPITRY!=CPI.VAL!(CPIX):_
16A7   023C                   CPIXSAV=CPIX:_
16A7   023C                   GOTO 4520
16D0   0240                IF CPI.VAL!(CPIX)=0 GOTO 4510    ' NO CPI IN THIS SLOT
16E3   0240                IF CPI.VAL!(CPIX)>NCPIREQ THEN_  ' DENSER THAN DESIRED
16E3   0240                   IF CPITRY!=0 THEN_            ' FIRST ACCEPTABLE CPI
16E3   0240                      CPITRY!=CPI.VAL!(CPIX):_
16E3   0240                      CPIXSAV=CPIX_
16E3   0240                   ELSE_
1719   0240                      IF CPI.VAL!(CPIX)<CPITRY! THEN_  ' COMPARE W/PREVIOUS ACCEPTABLE CPI
1719   0240                         CPITRY!=CPI.VAL!(CPIX):_     ' AND USE IF CLOSE TO DESIRED CPI
1719   0240                         CPIXSAV=CPIX
1737   0240        4510 NEXT CPIX
1748   0240             IF CPITRY!=0 GOTO 4550               ' NO ACCEPTABLE CPI
1752   0240        4520 PSUML$="": PSUMC$="": ADJMODE$="": PSUCOD$=""
1752   0240             IF NLPIREQ=6 THEN_
1752   0240                IF SIXLPI.YN$="Y" THEN PSUCOD$=SIXLPI.CODE$_  ' CAN SEND LPI CODES
1752   0240             ELSE_
1788   024C                IF SIXLPI.YN$="M" THEN PSUML$="6 LPI"        ' TELL OPERATOR TO SWITCH
179D   024C             IF NLPIREQ=8 THEN_
179D   024C                IF EIGHTLPI.YN$="Y" THEN PSUCOD$=EIGHTLPI.CODE$_  ' CAN SEND LPI CODES
179D   024C             ELSE_
17BF   024C                IF EIGHTLPI.YN$="M" THEN PSUML$="8 LPI"      ' TELL OPERATOR TO SWITCH
17D4   024C             IF CPI.CODE$(CPIXSAV)<>"" THEN_
17D4   024C                PSUCOD$=PSUCOD$+CPI.CODE$(CPIXSAV)_          ' CAN SEND CPI CODES
17D4   024C             ELSE_
17F7   024C                PSUMC$=STR$(CPI.VAL!(CPIXSAV))+" CPI"  ' TELL OPERATOR TO SWITCH
1811   024C             IF VMI.SIZE=0 GOTO 4530
181B   024C                ADJMODE$=VMI.CODE$        ' FINE LINE ADJUSTMENTS POSSIBLE
181B   024C                RESMODE$=PSUCOD$          ' CODES TO RESTORE AFTER ADJUSTMENT
181B   024C        4530 IF PSUML$="" AND PSUMC$="" GOTO 4540    ' NO MANUAL SWITCHING
1840   0250             LOCATE 15,1: PRINT "(Set printer to";
```

XIII

Demonstration of print processes

| Offset | Data | Source Line | |
|---|---|---|---|
| 184D | 0250 | PRINT PSUML$; | ' MANUAL LPI SWITCHING |
| 184D | 0250 | IF PSUML$<>"" AND PSUMC$<>"" THEN PRINT " and"; | ' BOTH SWITCHING |
| 188E | 0250 | PRINT PSUMC$;")"; | ' MANUAL CPI SWITCHING |
| 188E | 0250 | 4540 PRTFAC!=CPI.VAL!(CPIXSAV)/60 | ' FACTOR FOR CONVERTING POS VALUES TO CHAR POSITIONS |
| 189A | 0250 | RETURN | |
| 189A | 0250 | 4550 ' | |
| 18B1 | 0250 | PRINT "CANNOT PRINT FORM. REQUIRES PRINTER CAPABLE OF PRINTING" | |
| 18B1 | 0250 | PRINT "AT";NLPIREQ;"LPI AND AT";NCPIREQ;"CPI OR DENSER." | |
| 18B1 | 0250 | PRINT "PRESS ANY KEY TO RETURN TO THE MENU "; | |
| 18B1 | 0250 | 4560 K$=INKEY$: IF K$="" GOTO 4560 | |
| 18EC | 0250 | GOTO 110 | |
| 18EC | 0250 | ' --------------------------------------------------------- | |
| 18EC | 0250 | | |
| 18EC | 0250 | ' EXIT TO OPERATING SYSTEM | |
| 18EC | 0250 | ' --------------------- | |
| 18EC | 0250 | 5000 SYSTEM | |
| 18EF | 0250 | ' --------------------------------------------------------- | |
| 18EF | 0250 | | |
| 18EF | 0250 | ' ERROR MESSAGE | |
| 18EF | 0250 | ' ------------- | |
| 18EF | 0250 | 5100 PRINT CHR$(7) | |
| 18F2 | 0250 | PRINT "PRESS ANY KEY TO CONTINUE"; | |
| 18F2 | 0250 | 5110 K$=INKEY$: IF K$="" GOTO 5110 | |
| 1913 | 0250 | GOTO 110 | |
| 1913 | 0250 | ' --------------------------------------------------------- | |
| 1913 | 0250 | | |
| 1913 | 0250 | ' GET FIELD PARAMETERS | |
| 1913 | 0250 | ' -------------------- | |
| 1913 | 0250 | 8000 FLDPROMPT$=FLDPROMPT$(FLDPTR) | |
| 1916 | 0250 | FLDLEN    =FLDLEN(FLDPTR) | |
| 1916 | 0250 | PRTLIN    =PRTLIN(FLDPTR) | |
| 1916 | 0250 | PRTPOS    =PRTPOS(FLDPTR) | |
| 1916 | 0250 | RETURN | |
| 1916 | 0250 | | |
| 1916 | 0250 | ' STORE FIELD PARAMETERS | |
| 1916 | 0250 | ' ---------------------- | |
| 1916 | 0250 | 8100 IF PRTLIN>127 THEN PRTLIN=127 | |
| 1955 | 0250 | IF PRTPOS>1023 THEN PRTPOS=1023 | |
| 1966 | 0250 | FLDPROMPT$(FLDPTR)=FLDPROMPT$ | |
| 1966 | 0250 | FLDLEN(FLDPTR)    =FLDLEN | |
| 1966 | 0250 | PRTLIN(FLDPTR)    =PRTLIN | |
| 1966 | 0250 | PRTPOS(FLDPTR)    =PRTPOS | |
| 1966 | 0250 | RETURN | |
| 1966 | 0250 | | |
| 1966 | 0250 | ' GET CHARACTER | |
| 1966 | 0250 | ' ------------- | |
| 1966 | 0250 | 8200 C$=INKEY$: IF LEN(C$)=0 GOTO 8200 | |
| 19AA | 0250 | RETURN | |
| 19AA | 0250 | | |
| 19AE | 0250 | | |

XIV